(12) United States Patent
Skinner et al.

(10) Patent No.: US 7,474,892 B2
(45) Date of Patent: Jan. 6, 2009

(54) NOTIFICATION MECHANISMS IN A WIRELESS DEVICE

(75) Inventors: Craig S. Skinner, Snohomish, WA (US); John Richard Brown, Lynnwood, WA (US); Mindy Chahel, Santa Clara, CA (US); Lisa King, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

(21) Appl. No.: 11/769,626

(22) Filed: Jun. 27, 2007

(65) Prior Publication Data

US 2008/0045200 A1 Feb. 21, 2008

Related U.S. Application Data

(63) Continuation of application No. 09/865,108, filed on May 24, 2001, now Pat. No. 7,260,390, which is a continuation-in-part of application No. 09/710,156, filed on Nov. 9, 2000, now Pat. No. 6,928,300.

(51) Int. Cl.
*H04M 3/00* (2006.01)

(52) U.S. Cl. .................. 455/420; 455/418; 455/528; 455/458; 379/373.01; 379/88.12; 379/207.16

(58) Field of Classification Search .............. 455/567, 455/411–413, 414.1, 550.1, 418, 566, 456.1, 455/528, 422.1, 456.4, 423, 458, 552, 552.1, 455/420; 379/201, 140, 373, 67.1, 88.11, 379/207.15, 207.16, 211.03, 88.12, 211.01, 379/88.26, 210, 214, 201.01, 210.01, 214.1
See application file for complete search history.

(56) References Cited

U.S. PATENT DOCUMENTS

| 5,329,578 | A | * | 7/1994 | Brennan et al. ........ 379/211.03 |
|---|---|---|---|---|
| 5,845,219 | A | * | 12/1998 | Henriksson .................. 455/567 |
| 5,889,852 | A | | 3/1999 | Rosecrans et al. |
| 6,070,055 | A | | 5/2000 | Uchida |
| 6,131,046 | A | | 10/2000 | Sano et al. |
| 6,209,011 | B1 | | 3/2001 | Vong et al. |
| 6,317,593 | B1 | | 11/2001 | Vossler |
| 6,453,182 | B1 | | 9/2002 | Sprigg et al. |
| 6,650,746 | B1 | * | 11/2003 | Groen et al. ........... 379/207.16 |
| 6,653,930 | B1 | * | 11/2003 | Bonomo et al. ............ 340/7.59 |
| 6,751,485 | B2 | * | 6/2004 | Ranta .......................... 455/567 |
| 6,816,878 | B1 | * | 11/2004 | Zimmers et al. ............ 709/200 |
| 6,836,656 | B2 | | 12/2004 | Nakae et al. |
| 6,914,519 | B2 | * | 7/2005 | Beyda .................... 340/286.02 |
| 6,928,300 | B1 | | 8/2005 | Skinner et al. |
| 7,006,817 | B2 | * | 2/2006 | Awada et al. ................ 455/411 |
| 7,197,127 | B2 | * | 3/2007 | Stevens ................. 379/207.15 |
| 2004/0264654 | A1 | * | 12/2004 | Reding et al. ............ 379/88.12 |
| 2006/0030302 | A1 | * | 2/2006 | Andrew et al. ........... 455/414.1 |

\* cited by examiner

*Primary Examiner*—Sujatha Sharma
(74) *Attorney, Agent, or Firm*—Fenwick & West LLP

(57) ABSTRACT

A panel has been provided to a wireless device that turns off all RF capability of the wireless device (including, but not limited to notifications, wireless web clipping, instant messaging, email sending/receiving, phone calls, etc.). The panel is brought up on a screen of the wireless device by pressing a programmed hard button for more than 1 second. Once the RF capability has been turned off, if the user attempts to access a program or other device that requires the RF capabilities, a notification is displayed that identifies the RF capabilities as being disabled and prompts the user whether to continue. If the user continues, the RF device is automatically enabled, otherwise the RF device remains disabled.

18 Claims, 17 Drawing Sheets

NOTIFICATION MECHANISMS IN A WIRELESS DEVICE

CROSS REFERENCE TO RELATED APPLICATIONS

This application is a continuation of U.S. patent application Ser. No. 09/865,108, filed May 24, 2001, which is a continuation-in-part of U.S. Pat. No. 6,928,300, filed Nov. 9, 2000, both are incorporated herein by reference, in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of Art

This invention relates generally to user interfaces and enablement of radio capabilities of a wireless device. The invention is more particularly related to radio capability enablement and user interfaces for phone and Personal Digital Assistants (PDAs).

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to be handheld or placed in a pocket, and allows a user and run various applications including personal information management applications such as address books, daily organizers, etc. These applications make people's lives easier.

A popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™ 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices (Palm tops) offer Internet connectivity capabilities, as well as a vast array of hardware and software choices. Palmtops have evolved from simple organizers into a new kind of handheld that people use to instantly manage all kinds of information, from email, to medical data, to stock reports.

Mobile telephones (cell phones, PCS, satellite phones, etc) are also common tools in today's world. Many cell phones include rudimentary functionality for maintaining telephone numbers and other functionality to help alleviate the burdens associated with making calls and tracking phone numbers. In addition, the modern cell phone also has options for personalizing the style of various phone operations.

One trend in the PDA marketplace is the integration of radio based services into the PDA. One pioneering example is the Palm VIIx which includes RF capabilities to access a wireless network (palm.net) to provide email and web-clipping internet access to users.

However, despite the great capabilities and conveniences of the modern PDA, and the cell phone, many innovations are needed for expanding the capabilities and for increasing the convenience of using PDAs and cell phones.

SUMMARY

The present inventors have realized the need to enable and disable RF capabilities of PDA's Cell Phones, and other wireless devices, and the need for convenient access to the RF capabilities when needed. Disclosed embodiments provide a panel that turns off all RF capability of the wireless device (including, but not limited to notifications, wireless web clipping, instant messaging, email sending/receiving, phone calls, etc.). The panel is brought up by tapping an icon or via a menu. The RF capabilities may also be turned ON/OFF by pressing a programmed hard button for more than 1 second.

Once the RF capability has been turned off, if the user attempts to access a program or other device that requires the RF capabilities, a notification is displayed that identifies the RF capabilities as being disabled and prompts the user to determine if s/he wants to continue. If the user continues, the RF device is automatically enabled, otherwise, the RF device remains disabled.

Disclosed embodiments are embodied as an electronic device, comprising, an radio unit configured to communicate with a network, at least one memory device configured to store application and system programs, and a processing unit coupled to said radio unit and said at least one memory device, said processing unit configured to run the application and system programs, wherein at least one of the application and system programs include a software enabled switch for enabling and disabling the radio unit. Furthermore, one disclosed embodiment includes a notification program configured to notify a user if the radio is disabled upon invoking a program that utilizes the RF device, and allows automatic enablement of the RF device if the user indicates the program is to continue.

Disclosed embodiments include a method of notifying a user of an RF enablement status of a device having RF capabilities, comprising the steps of, identifying the invocation of a mechanism requiring access to the RF capabilities, determining the RF enablement status of the RF device, if the RF device is not enabled: prompting a user of the device if the mechanism is to be granted RF access, and retrieving a user input regarding whether RF access should be granted to the mechanism requiring RF access, if the user input indicates the mechanism is to be granted RF access: automatically enabling the RF device, and allowing the mechanism requiring RF access to continue and access the RF device, and, if the user input indicates the mechanism should not be granted RF access, then, shutting down the mechanism requiring RF access without enabling the RF device.

Both the device and method may be conveniently implemented in programming configured to be executed on a general purpose computer, or networked computers, and the results may be displayed on an output device connected to any of the general purpose computer, networked computers, or transmitted to a remote device for output or display. In addition, any components of the disclosed embodiments represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the disclosed embodiments and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
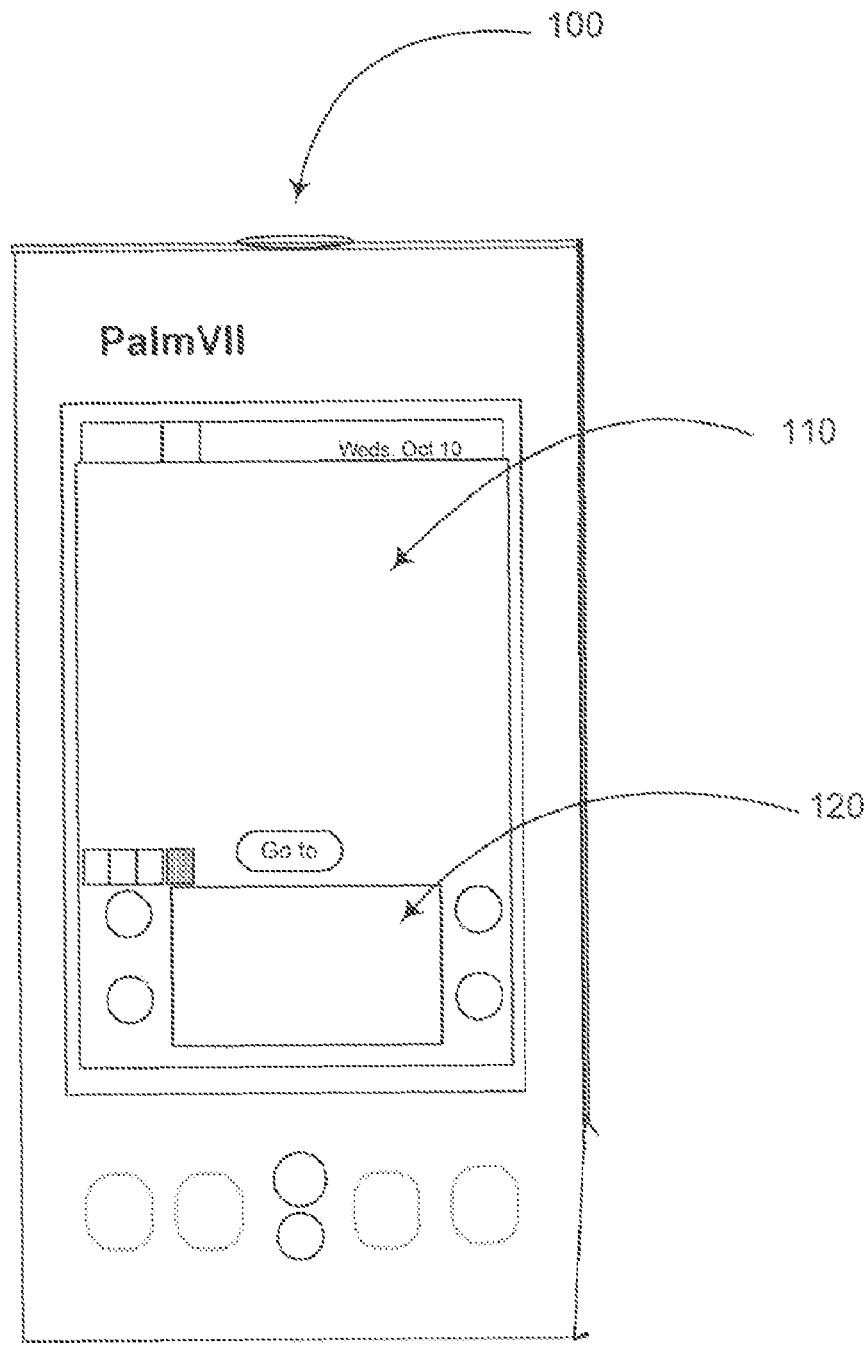
FIG. 1 is a Palm™ handheld computer.
Figure 2:
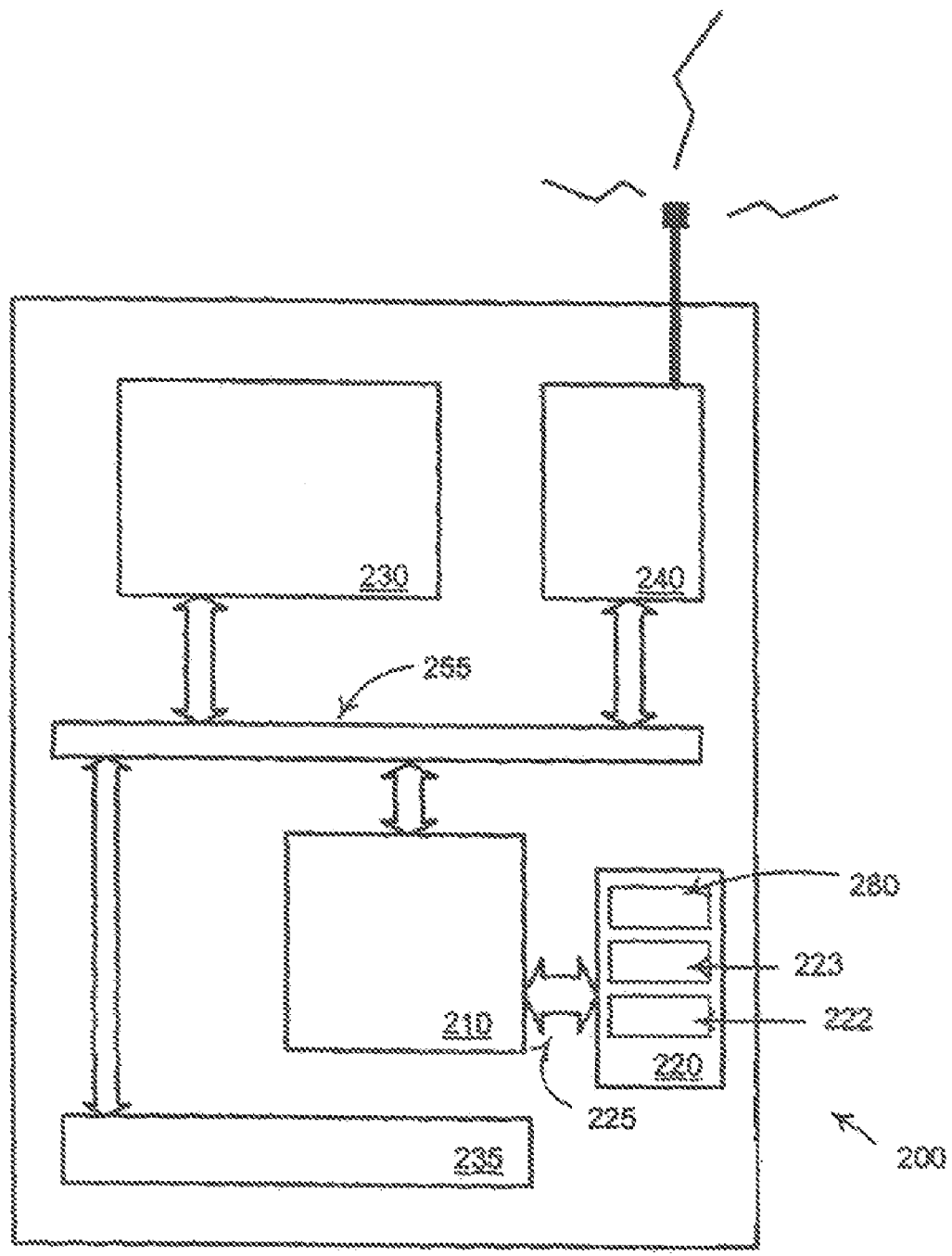
FIG. 2 is a block diagram of selected components of an embodiment of a PDA device with radio frequency (rf) capabilities according to the disclosed embodiments.

Referring again to the drawings, wherein like reference numerals designate identical or corresponding parts, and more particularly to FIG. 2 thereof, there is illustrated a block diagram of selected components of a handheld computer 200 that includes RF capabilities. The handheld computer 200 includes a processing unit 210, for executing applications and an operating system of the computer 200, a memory device 220 for storing the operating system, data, and the applications. A memory bus 225 is utilized to transfer programs and data from memory to the processing unit 210.

A display screen 230 is provided (preferably a touch sensitive screen) for display of Operating System prompts, buttons, icons, application screens, and other data, and for providing user inputs via tapping or touching (or drawing in the Graffiti™ area 120) via a stylus or other touch mechanism. Hardware interface 235 connects to physical hard buttons and switches located on a body of the computer 200 and provides signals to applications running on the processing unit 210.

An RF capable device 240 provides connectivity to a cellular telephone network (not shown) or other RF network. The RF capable device 240 may, for example, be a cellular telephone or a palm.net™ enabled radio device for wireless web-clipping, email, and other wireless connectivity communications. The RF capable device may also be a wireless Internet enabled radio device, such as Ricochet™, etc., pager, wireless e-mail device, Family Radio System (FRS), or any of different mobile telephones, including cellular, satellite, PCS, TDMA, GSM, etc. Although the RF capable device is shown as an internal component to the computer 200, the RF device may be contained in sled or other configuration that attaches to an exterior of the computer 200, or may be a separate device connected to the computer via a cable or other connection (wireless, IR, RS232, USB, Firewire, network connection, etc., for example).

A system bus 255 carries data and commands to/from the processing unit 210 from/to other devices within or attached to the computer 200. For example, user applications running on the computer 200 send application screens and other data outputs to display screen 230 for display via the system bus 255. User inputs (Graffiti™ area drawing, or tap selection, for example) are detected by the screen 230 and sent to the processing unit 210 via the system bus 255.

In addition to the operating system and user selected applications, an RF application, which may be a phone or other device that uses the RF device 240, having instructions stored in memory 220, executes on the processing unit 210. Alternatively, another hardware device may be included in computer 200 that utilizes RF device 240.

In one embodiment, the RF application is a phone device and the RF device is a wireless telephone. Phone calls from a network and directed toward the RF device 240 are detected by the RF device and sent, in the form of an incoming call notification, to the phone device executing on the processing unit 210. The phone device processes the incoming call notification by notifying the user by an audio output such as ringing (not shown).

The phone device also includes a method for the user to answer the incoming call. For example, tapping on a phone icon, or pressing a hard button designated or preprogrammed for answering a call signals the phone device to send instructions (via system bus 255) to the RF device 240 to answer the call.

Outgoing calls are placed by a user by entering digits of the number to be dialed and pressing a call icon, for example. The dialed digits are sent to the RF device 240 along with instructions needed to configure the RF device 240 for an outgoing call. Alternatively, the RF application is a web, palm.net, e-mail, or other RF communication device, appropriate instructions are sent to the RF device 240 to instruct or otherwise administer the communication. The Administration of the communication may include, for example, communication of content and a destination address to send the content to the RF device 240, or receiving an email and storing it in memory (memory 220, for example) and/or displaying it to a user.

Preferably, the computer 200 is a PDA device having interactive hardware and software that perform functions such as maintaining calendars, phone lists, voice or audio related functions integrated or attachably integrated (via a connector device, for example, not shown), and at least one of these configured for use with the RF capabilities of the PDA. Several examples of a configuration and details of devices for connecting or integrating voice function devices to a PDA are described in Maes et al., application Ser. No. 09/709,225, entitled, "INTEGRATING VOICE FUNCTION INTO A PDA," filed Sep. 29, 2000, the contents of which are incorporated herein by reference in their entirety.

The software, including a phone or other RF applications, operating system, and other general applications (word processors, spreadsheets, games, databases, etc.) 223 are stored in memory device 220 along with program data, graphics, and other data and executed on the processing unit 210.

Processing unit 210 executes the software, including the operating system (OS, including a User Interface (UI) of the OS), and other user applications as directed by user inputs. The user applications display outputs on the display screen 230 and receive inputs from taps, tap & hold, and writing operations on the display screen and from programmed hard buttons attached to the hardware interface 235.

Memory device 220 is constructed of RAM memory or ROM memory, or a combination of both ROM and RAM, and may include flash memory components. In one embodiment, an operating system 222 resides on a ROM portion of the memory 220 and provides executable instructions to perform operating system functions of the handheld computer 200. User applications 223 generally reside in a RAM portion of the memory 220. The present invention is contained in a program stored on ROM. However, the invention may also be programmed within the operating system 222, or may be a separate program contained in RAM or any other storage device (program 280, for example). When the present invention is invoked, computer instructions from the operating system 222 or program 280 are executed on processing unit 210 which issue commands that control the RF device 240 (e.g., enable/disable), or save or implement a schedule for enabling/disabling the RF device 240.

The above describes a basic environment (a cell phone or a PDA with RF capabilities) in which the present invention is practiced. However, it should be understood that many different electronic devices, including cell phones, PDA's of different configurations and various integrated or attached devices and/or RF capabilities are also suitable environments in which the present invention may also be practiced.

Figure 3:
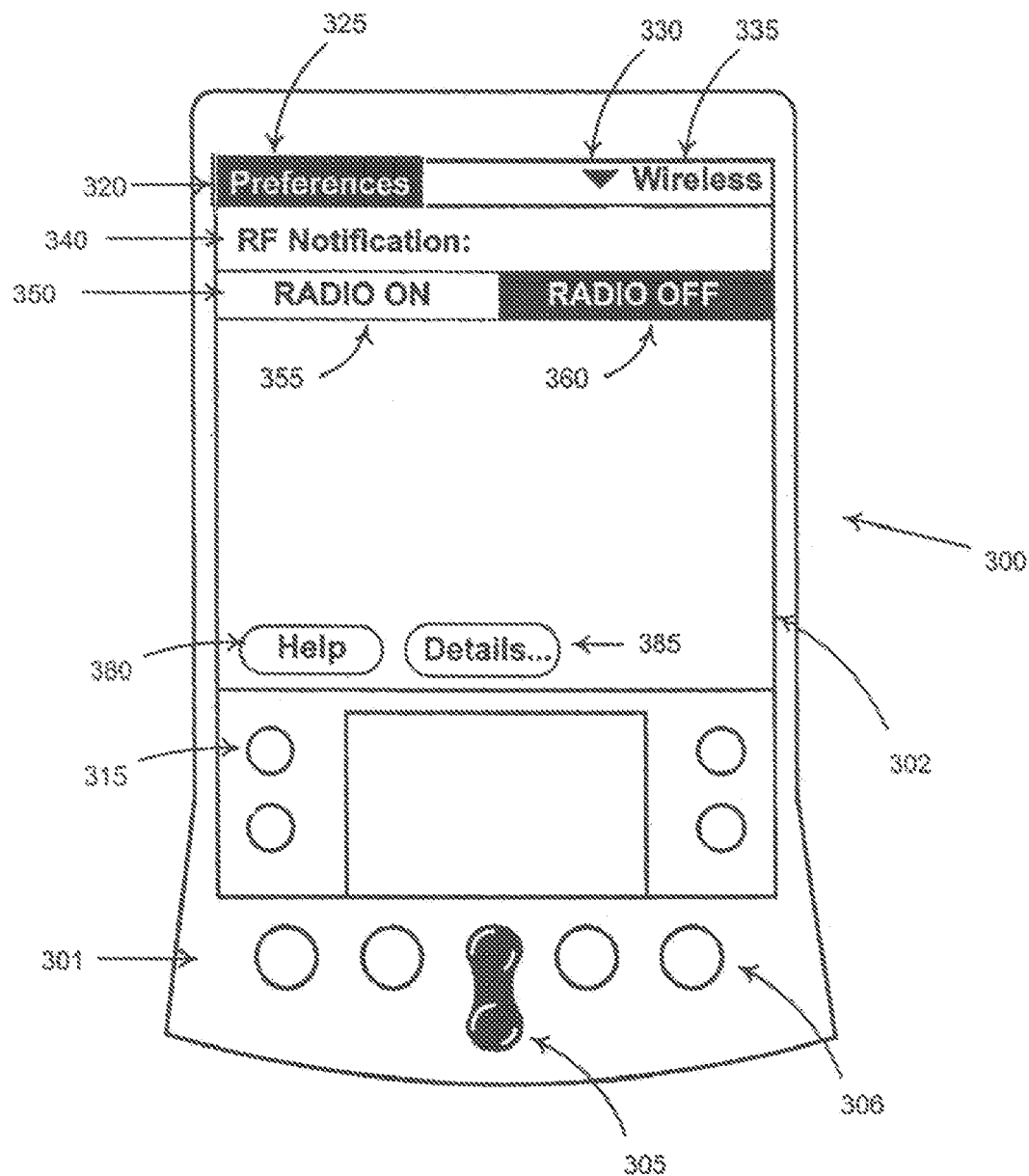
FIG. 3 is a screen shot on a Palm™ of an embodiment of a radio on/radio off preferences dialog according to the disclosed embodiments.

FIG. 3 is a screen shot of a handheld computer device 300 executing an embodiment of the present invention and illustrating a Radio ON/OFF preference screen according to the present invention. The handheld computer includes a series of hard buttons 301 that are programmable or hardwired to activate/deactivate various functions of the handheld computer, including, for example, turning the computer on or off, activating operating system functions, activating programs, etc. (power button 303, rocker switch 305, and application button 306, for example). Touch sensitive areas 315 on the display screen 302 are also programmable to invoke various functions of the operating system or user applications of the handheld computer. A status bar 320 includes a general screen identifier 325 (preferences in this example), a preference panels list trigger (icon) 330, and a subcategory identification 335 (wireless in this example). The preference panels list trigger (icon) 330, when tapped, brings a pull down menu that allows the user the option of switching to other preference screens (setting the time and date, entering user information, and other preferences, for example). A wireless preferences function 340 (RF Notification in this example) is displayed along with options 350 for setting preferences for the RF device. In this example, the preferences are being set for a general wireless device (e-g., RF device 240), however the preferences may be set for a palm.net type wireless device, or a cell phone, GSM phone, or other wireless communications or accessories that may be included with or attached to the handheld computer 300. Individual preference screens may be provided for each of multiple wireless devices contained within or attached to computer 200. Alternatively, notification preferences for all the wireless devices may be combined and administered from a single screen simplifying the wireless preferences notifications selections that are needed from the user.

In one embodiment, the application button 306, when pressed by a user brings up an application preprogrammed by the operating system to be booted when application button 306 is pressed (a memo pad function, for example). However, if the application button 306 is held down for a 1st time period of approximately 1-2 seconds, a wireless preferences subprogram (e.g., RF Notification) is launched and a display screen such as that shown on display 302 in FIG. 3 is presented to the user. The time period that application button 306 is required to be held down to invoke the wireless preferences subprogram is selected by the developer. Any time period may be used.

User selectable options 350 include RADIO ON 355 and RADIO OFF 360. Each of these selectable options 350 are buttons displayed on the touch sensitive screen 302. However, any of the touch sensitive areas 315 or hard buttons 301 may also be programmed to perform the same functions (using the display screen 302 to advise the user on which buttons perform these functions, for example). If the ON button 355 is pressed, wireless capabilities of the handheld computer 300 are immediately turned on and available for use by one or more applications or operating system programs or hardware devices contained in or attached to the computer 300. Any LEDs or other indicating lights associated with an ON status of either the radio devices (wireless devices) or any enabled notifications are also turned on as confirmation. After the ON button 355 is pressed, the devices wireless notifications, if enabled, will start immediately if messages, emails, telephone calls, etc. are received on any one or more wireless channels of the handheld computer 300. For examples of notifications that may be enabled when the RF device 240 is ON, the reader is directed to Skinner, application Ser. No. 09/710,156, referenced above.

If the RADIO OFF button 360 is pressed, the handheld computer 300 radio device(s) are immediately turned off. Again, any LEDs confirming notifications or the status of the radio device(s) are also turned off as confirmation. When the user presses RADIO OFF, the handheld computer 300 is no longer RF enabled and the radio is absolutely turned off, making the wireless device safe for entering no RF enabled device zones (such as airplanes and certain hospital areas, or when the user goes to bed or is in another area where the wireless device should not be used (classrooms, etc.)). Turning the radio device(s) off in this manner also effectively disables any applications using the radio device(s), including active applications initiated by the user or other programs and background applications that, for example, wake up at predetermined intervals to check messages, e-mails, pages, etc.

Figure 5A:
FIG. 5A is a screen shot of an example confirmation screen indicating that a PDA device having RF capability is airplane safe.
Figure 5B:
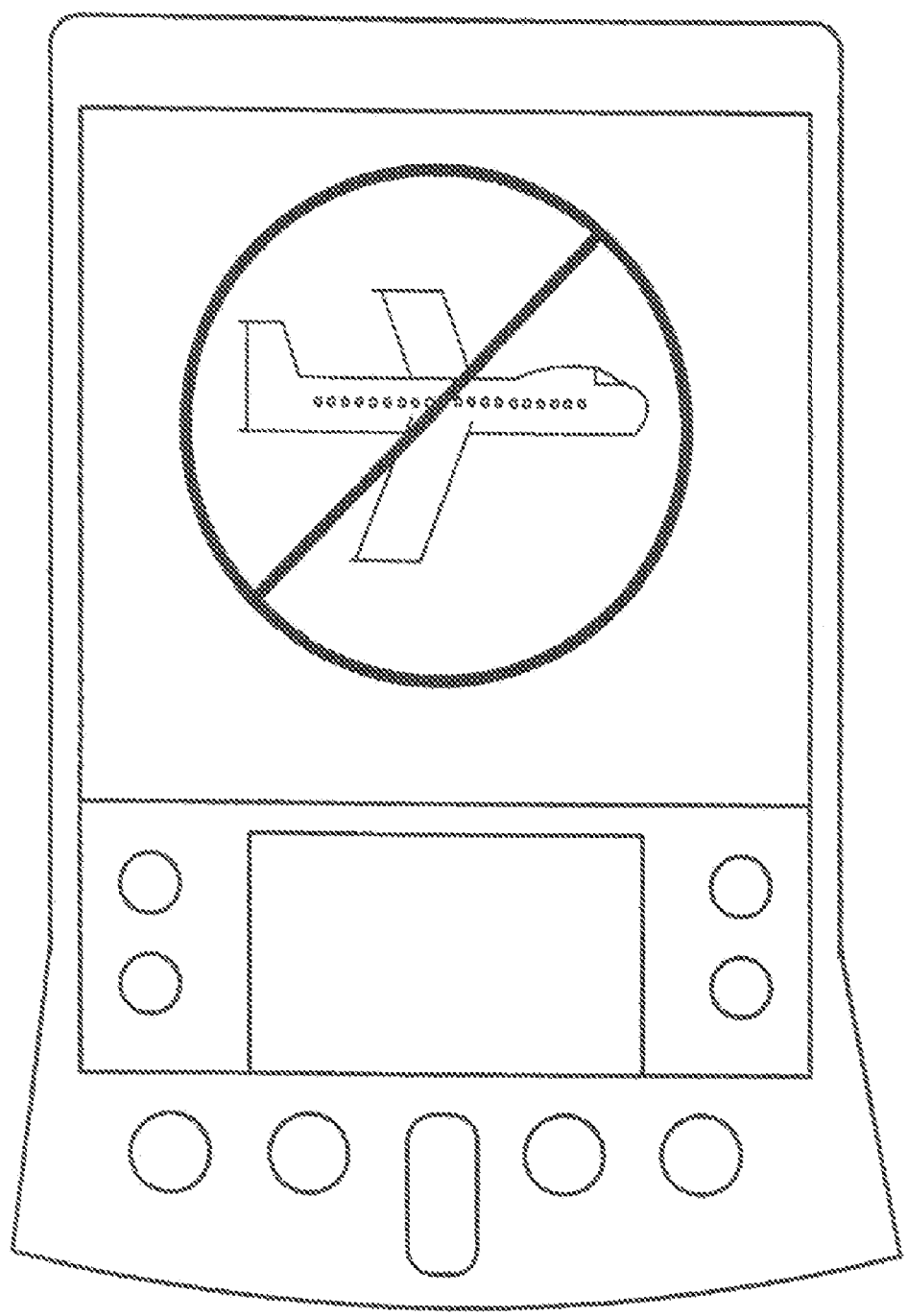
FIG. 5B is an example screen shot of a PDA having RF capability indicating the PDA is not airplane safe.

A feature of the present invention is to allow a user a quick method for checking a current status of the RF device. The process is to have a button pre-programmed to launch a check routine (RF status check) that tests the RF device and then displays a message, icon, or other indication of the RF status. In one embodiment, if the application button 306 is held down for a third time period (more than 3 seconds, for example), the check routine is invoked, and, if the RF device is not enabled, the appropriate indication is made (FIG. 5A, for example). If the RF device is enabled, a contrary indication occurs (FIG. 5B, for example). As with all the time periods discussed herein, any time period may be utilized, so long as conflicts between different time periods do not occur or are otherwise resolved.

In one embodiment, a single button (306, for example) is programmed for invoking each of the RF notification screen, turning the radio on or off, and the RF status check using the timed button hold down method discussed above. Alternatively, these invocations may be made by any combination of hard buttons, or combination of soft, touch sensitive buttons and/or hard buttons.

Continuing now with FIG. 3, help button 380, when pressed, will give the user specific directions on how to turn on or off the wireless device or set a schedule using the wireless preferences notification screen (FIG. 3, for example). Details button 385 provides the user with detailed information regarding the RF Notifications (e.g., types of RF devices enabled/disabled, or types of connections an RF device is configured, for example).

Figure 4:
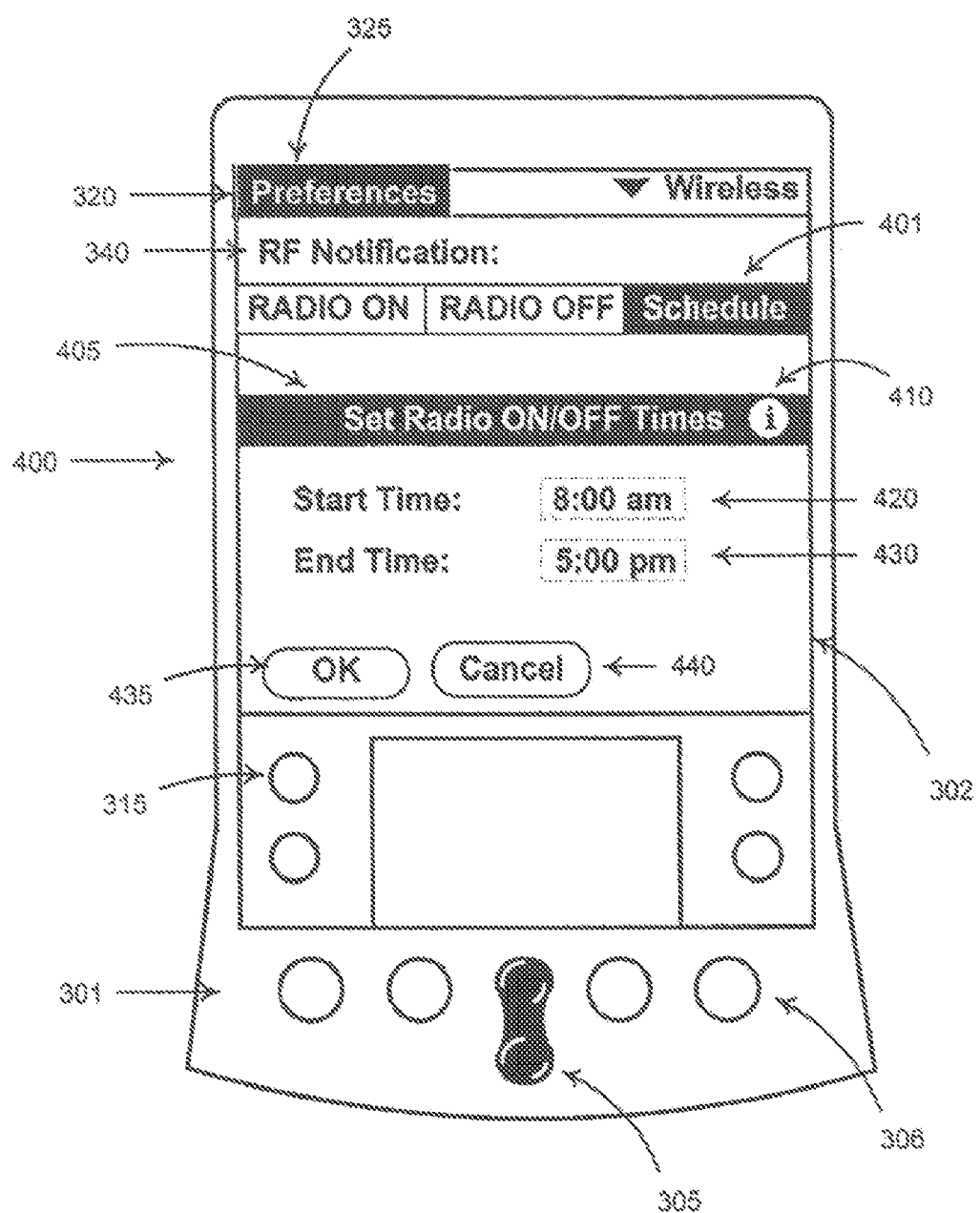
FIG. 4 is a screen shot on a Palm™ of an embodiment of a preferences set radio ON/OFF times dialog according to the disclosed embodiments.

Turning now to FIG. 4, another embodiment of the RF Notifications Screen is illustrated. If the user presses the schedule button 401, a second dialog (Set Radio ON/OFF Times 400) is displayed and the user can then confirm or set times that the user wants the RF device to be set on or off. The Set Radio ON/OFF Times screen 400 includes an identification bar 405 naming the screen. Information button ("i") 410, when pressed, provides specific information about the Set Radio ON/OFF Times (including, for example, information that might also be included in a help screen explaining how to use any of various options within the Set Radio ON/OFF Times screen). A start time area 420 provides the user an input area to indicate a start time when the RF device is to be enabled. An end time area 430 provides the user an area where an end time is specified after which the RF device is to be disabled. In this embodiment, the start and end times indicate a time period between which the RF device is to be enabled, and, in another embodiment, the start and end times indicate a period of time between which the RF device is to be disabled.

Although the present invention has been described with respect to enabling and disabling RF device(s), the present invention may also be utilized to enable and disable notifications, in tandem with RF device enablement/disablement or independently without necessarily enabling or disabling the RF device (s). In addition, a set of checkboxes or other selection mechanism may be provided to enable/disable multiple RF devices or individual functions associated with those devices (enable cell phone and disable instant messaging, for example).

Once the start and end time of the Set ON/OFF Times screen dialog are set, the enabling and disabling of the RF device(s) (and, perhaps, the associated notifications) will be handled automatically by the programming and/or electronics of the contained in or attached to the computer 300, for example. In one embodiment, the user must press an OK button 435 before start and end times will be set. Start and end times entered by the user may be cancelled by pressing the cancel button 445 (so long as the cancelled button is pressed before OK, previously existing start and end times will not be changed).

Examples of Radio ON/OFF times are likely to be scheduled by a user include regular periods of sleep of the user, scheduled classes or staff meetings, for example. In one embodiment, the Set Radio ON/OFF Times screen includes a date function that allows a user to select particular dates to be associated with the on/off and/or enabled/disabled times or to set recurring time intervals such as every Monday between 3:00 and 5:00 or each weekday between 1:00 p.m. and 2:00 p.m. for example. Thus the user is provided a flexible way to ensure that the cell phone or other RF device does not interrupt at scheduled times when it would be inconvenient or impolite to have a notification alarm or buzzer occur, or to completely disable the RF device during times when it would be dangerous or illegal to have an RF device operating (during hospital visits, or on an airplane, for example).

Figure 6:
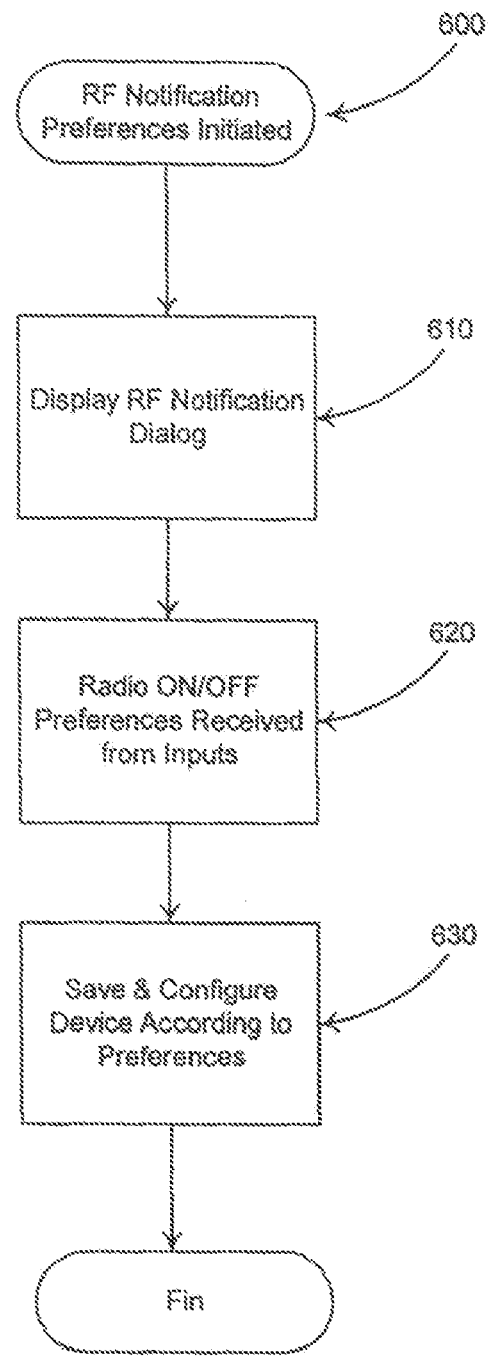
FIG. 6 is a flow chart illustrating an embodiment of a set radio ON/OFF process according to the disclosed embodiments.

FIG. 6 is a flow chart illustrating a high level process according to an embodiment of the present invention. At step 600 the user initiates the RF notifications preferences screen. The screen may be invoked by pressing the application button 306 for between 1-2 seconds, for example. The users actions are recognized by a program (OS 222, for example) and the RF notifications dialog (see FIG. 3 for example) is displayed (step 610). User action such as selecting the RADIO ON button 355 or RADIO OFF button 360 are received (step 620) by the program of the present invention. At step 630, the selected preferences are saved and the device (handheld computer 300, for example) is immediately configured according to those inputs.

Figure 7:
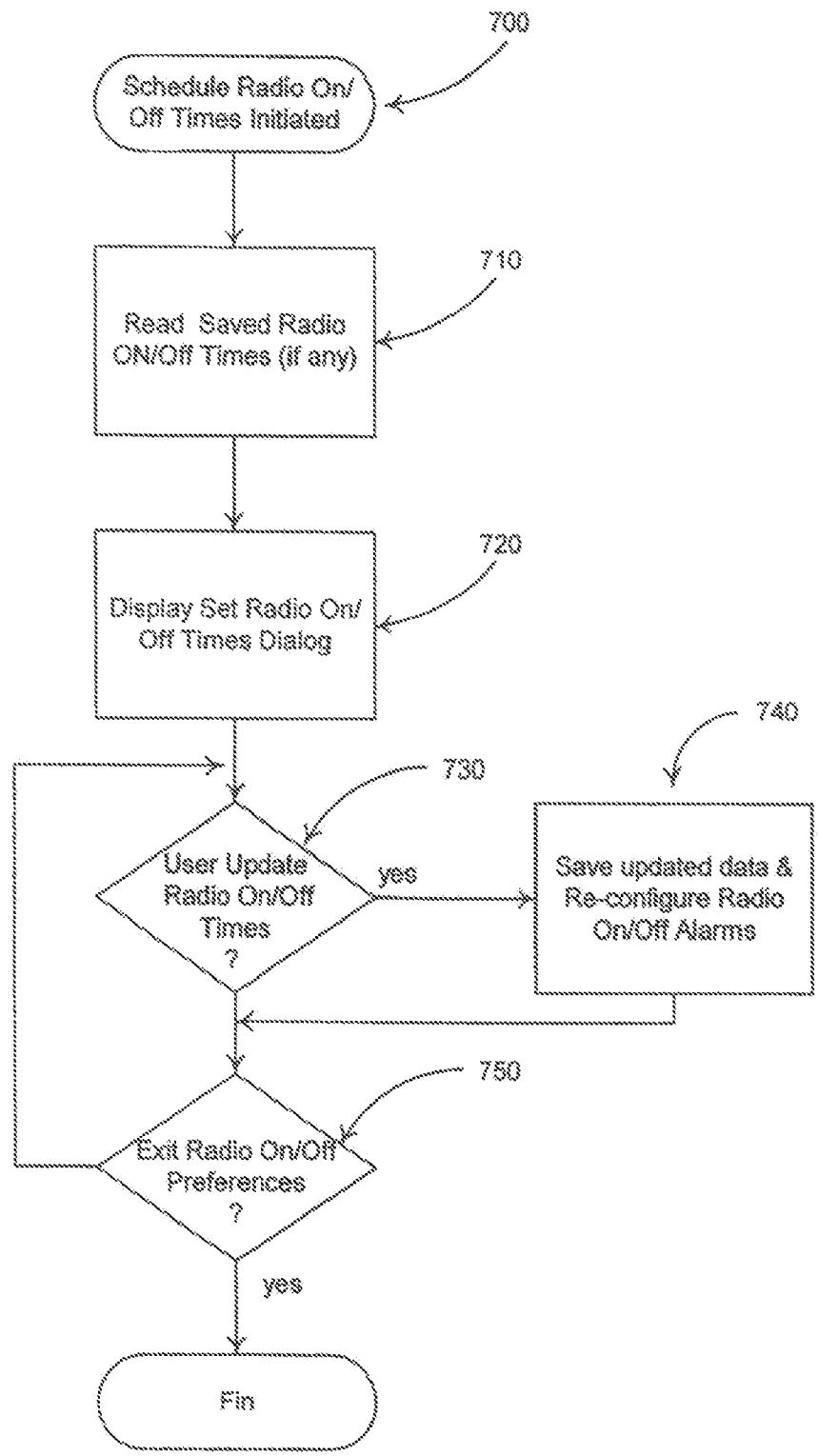
FIG. 7 is a flow chart illustrating an embodiment of a set scheduled radio ON/OFF process according to the disclosed embodiments.

FIG. 7 is a flow chart illustrating an embodiment of processing involved in setting scheduled Radio ON/OFF Times according to the present invention. At step 700, a user selects to set scheduled Radio ON/OFF times (pressing schedule button 401, for example). At step 710, currently saved preferences for the scheduled Radio ON/OFF times, if any, are read (from RAM memory portion of memory 220, for example). The current preferences are then displayed along with a Set Radio ON/OFF Times dialog (dialog 400, for example). Step 730 through 750 are a loop where a user updates the Set Radio ON/OFF Times (with a new start time, and/or a new end time and then pressing OK 435, for example), at which point new start/end times are saved and the device is configured according to the new times. In one embodiment, the Set Radio ON/OFF Times dialog is exited on reconfiguration of the device (upon pressing OK for example). If the user makes an affirmative action to leave the Set Radio ON/OFF Times screen (pressing cancel, or initiating another screen through one of the hard buttons or tapping another area of the screen, for example) the Set Radio ON/OFF Times dialog is exited to bring up another function for example (without altering the previously set Radio ON/OFF Times). In another embodiment, as soon as the user enters a new start or stop time, it is saved and the PDA configures alarms to implement the new times.

Figure 8:
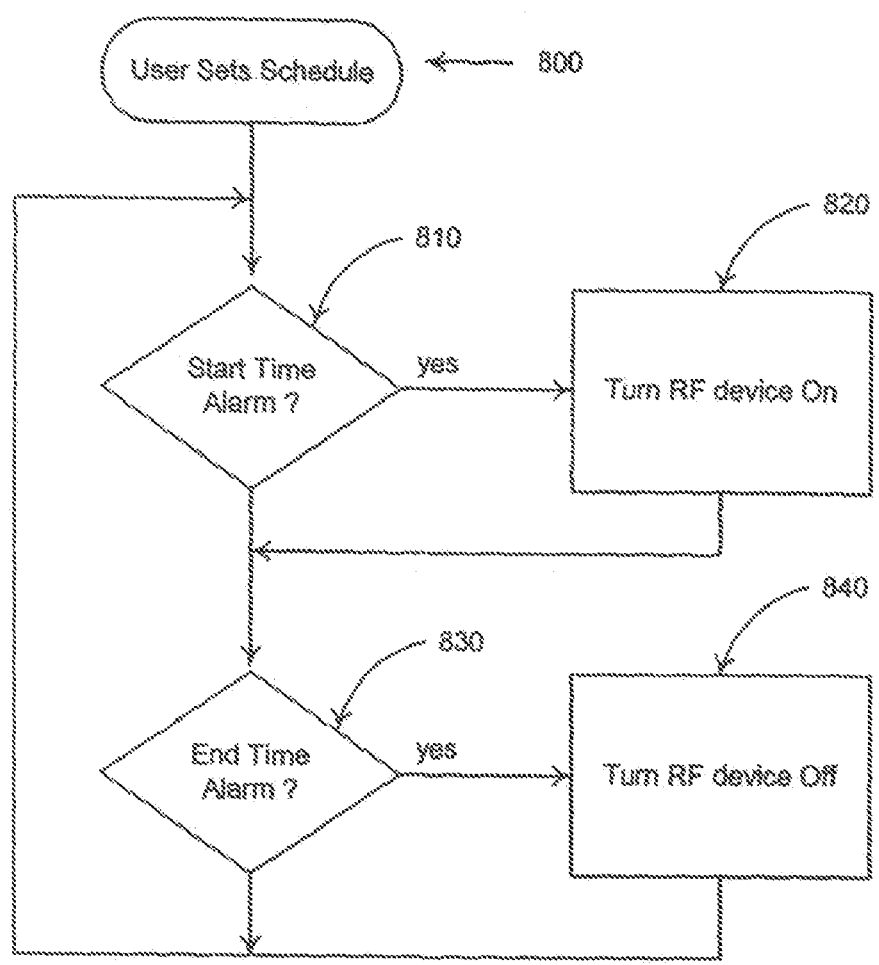
FIG. 8 is a flow chart illustrating an embodiment of a schedule implementation process according to the disclosed embodiments.

FIG. 8 is a flow chart illustrating an embodiment of internal processing formed in accordance with the Set Radio ON/OFF Times of the present invention. When the device is configured based on the set notifications times, and internal OS alarm is set for each of the start and end times set on the Set Radio ON/OFF Times dialog. This is performed when the user sets the schedule (step 800) as described above. Assuming that the device is currently in an RF disabled state, at some point the start time alarm (an alarm set according to the start time of the set notification times screen) occurs (step 710). When the start time alarm occurs, the RF device (and, perhaps, notifications) are enabled (turn RF device on step 720). Now that the RF device and notifications are enabled, when the end time (set on the set notifications times dialog) is reached a second internal OS alarm occurs (step 730), and the RF device (s) are disabled (turn RF device off step 740).

Figure 9:
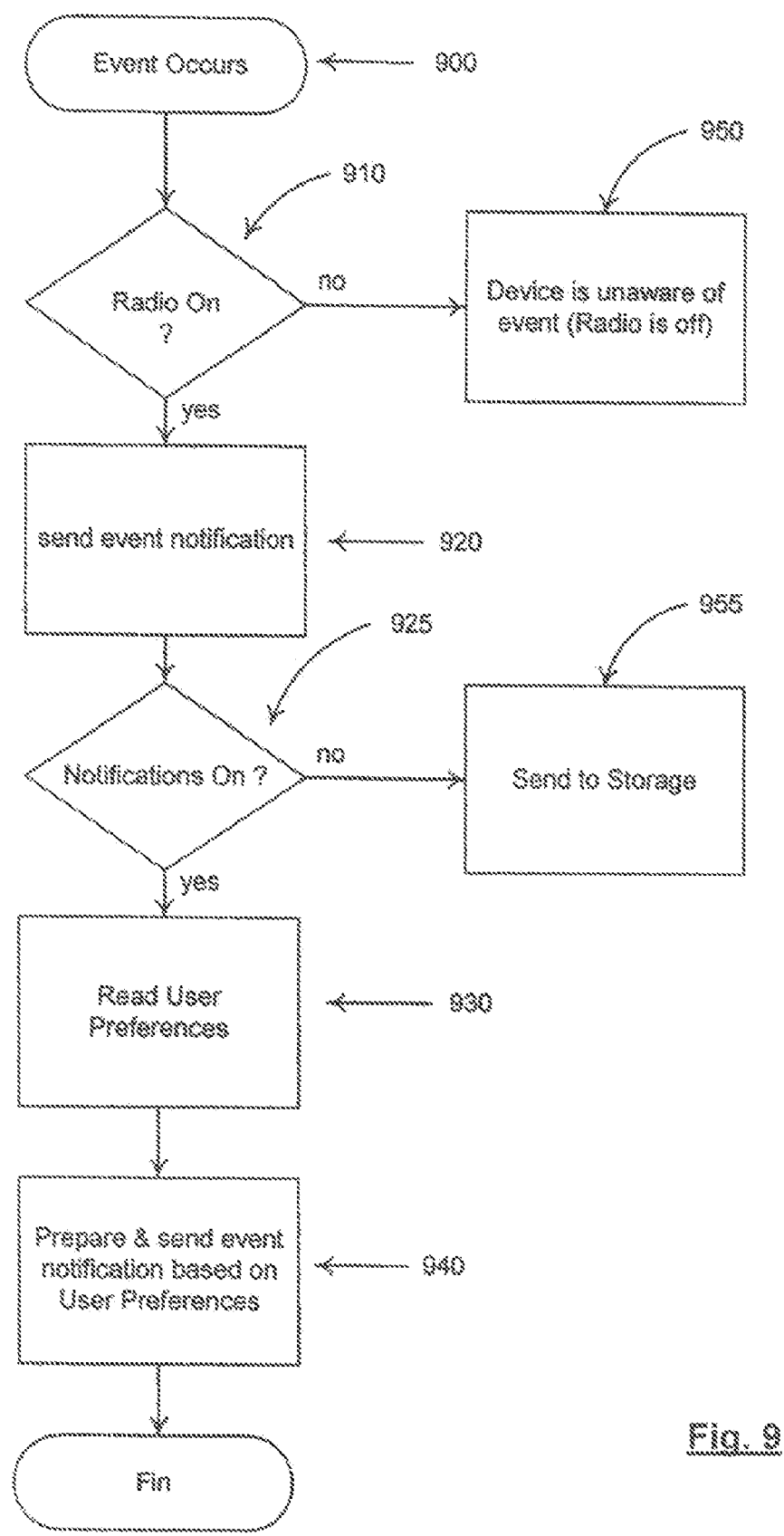
FIG. 9 is a flow chart illustrating an embodiment of an event notifications process according to the disclosed embodiments.

FIG. 9 is an example embodiment of processing that occurs when an event occurs (step 900) requiring the RF device and/or a notification (e.g., incoming call, email, etc.). If the RF device is on (user had previously pressed ON button 355, for example), or the event occurs within a schedule (as prescribed by the set notification times dialog 400, for example) (step 910), then, the RF device is able to recognize or accept the event call, email, etc. An event notification is sent to the program or device controlling the RF device that receives the incoming event (step 920). After receiving the event notification, the control program determines if notifications are set. If disabled, the incoming event is sent to a corresponding storage location (step 955), such as, for example, voicemail for a phone call event, and inbox for an email event.

If notifications are enabled, the control program reads the user preferences (step 930), that indicate the type of user notification to be utilized (ringer, vibrator, etc.). At step 940, the user notification is activated (ringing a bell, or vibrating the device, for example). If at the time the event occurs, the notifications are off, or not within the schedule set by the user in the set notifications times dialog, the RF device is off and unaware of the event and no action occurs (step 950).

In addition to turning the RF device on and off, the processes of the present invention may also be applied to the manner in which notifications are received. For example, additional user options may include specific scheduled time periods and types of notification to be used in conduction with the RF device ON/OFF times. For example, setting notifications to ring between 7:01 AM and 10:59 PM, setting notifications to vibrate mode every Tuesday and Thursday from 1 PM to 3 PM and every Wednesday from 5 PM to 8 PM and setting the RF device to be off (also disabling all notifications associated with the RF device) between 11 PM and 7 AM.

In one embodiment, although the user sets the RF device(s) off (by pressing the RADIO OFF button 360, for example) other functionality of the device 300 is still operable (PDA functions, games, applications, day timer, etc.). In addition, unless also disabled by the user, notifications associated with this other functionality (e.g., calendar alarms) are also still operable.

Some RF devices connect to networks that save incoming messages on the network when the RF device is disabled. In this case, after a period of RF device disablement, a user may receive one or more incoming communications (and notifications) that notify the user that these messages were saved or simply a notification that the event occurred.

Figure 10:
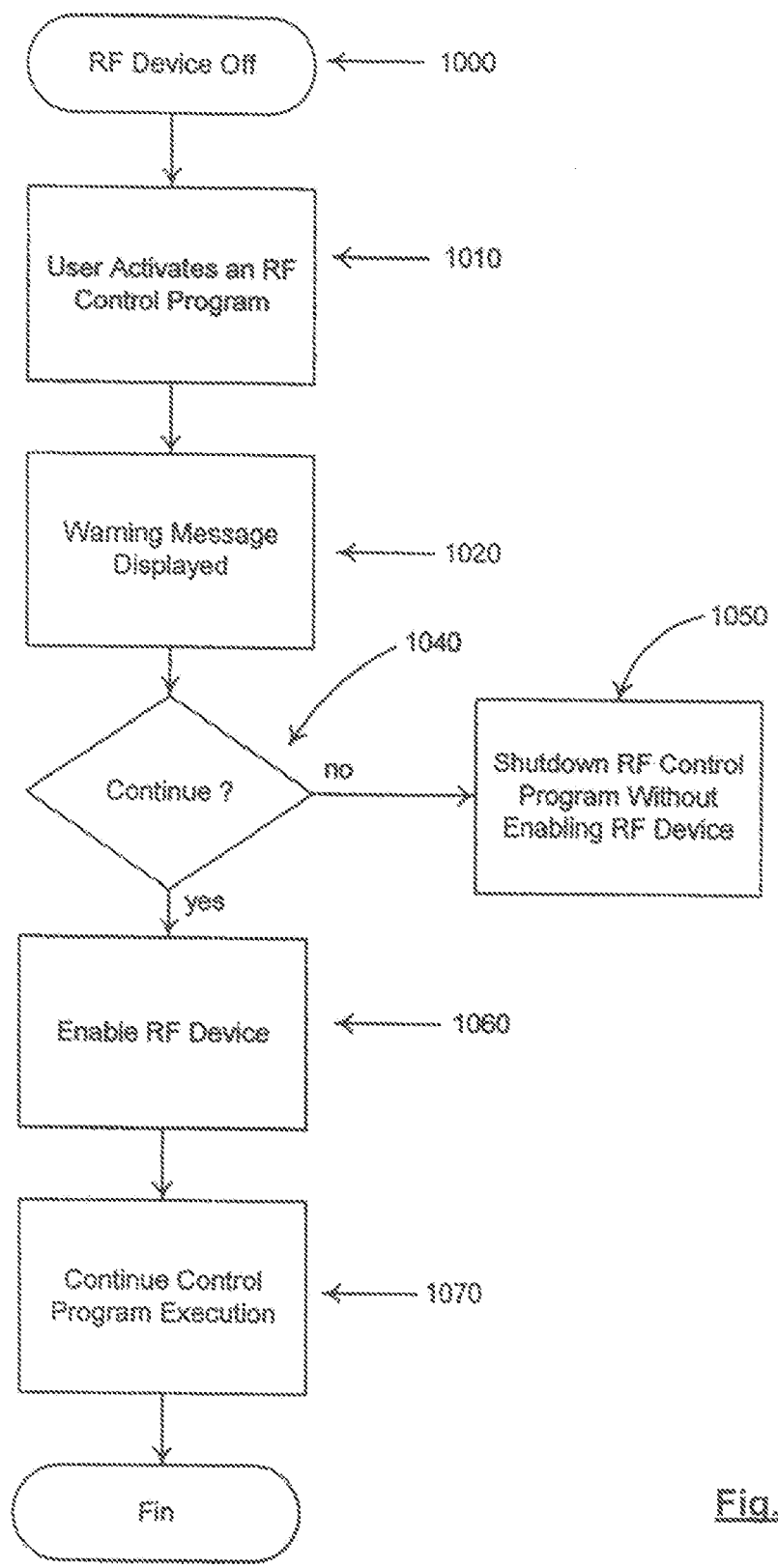
FIG. 10 is a flow chart illustrating an embodiment of device off warning and RF device activation procedures according to the disclosed embodiments.

FIG. 10 is a flowchart illustrating an RF device off warning and RF device on procedures according to an embodiment of the present invention. At step 1000, the RF device is off. A problem encountered is that a user may forget that the RF device is off and activate a program or other device that uses the RF device. Automatic RF device activation might solve this problem, but would create another problem in the case(s) where the RF device was disabled due to presence in a no RF zone, such as a hospital or aircraft.

At step 1010, the user attempts to activate an RF control program or other device that uses the RF device for communications. The RF control program may be, for example, a phone control program/device, a web clipping application, AOL chat, pager, instant messenger, etc. The attempted activation triggers a warning procedure (a separate program, subroutine, or other procedure built into the RF control program, for example) that displays a message to the user. The warning message includes, for example, a statement indicating that the RF device has been disabled and a proceed button which the user may press if other user wishes to continue and have the RF device activated.

The present inventor research indicates that prompting a user in this manner will remind the user why the RF device was disabled, whether that reason was to save battery power, to keep from being interrupted, and/or because the user had entered a no RF zone. If the latter, the user may decide, based on the warning message, to not continue use of RF device if the user is still located in a no RF zone.

In one embodiment, messages sent to/from the radio device 240 use a protocol stack that performs all formatting and un-formatting needed to send or receive the messages over the network communicated with by the radio device. Included in the protocol stack is a check routine that determines if the radio device is currently active. If not active, the check routine then calls another program to display the warning message and retrieve user instructions. If the user does not wish to activate the radio devices, an error condition is returned from the protocol stack to the program or device that initially required RF device access (allowing the program to shutdown gracefully or provide the user with other options). If the user indicates that the RF device may be enabled, the RF device is automatically enabled and the message transaction is completed. The protocol stack may be, for example, a Mobitex stack used in conjunction with RF devices for communicating on Mobitex networks.

Figure 11:
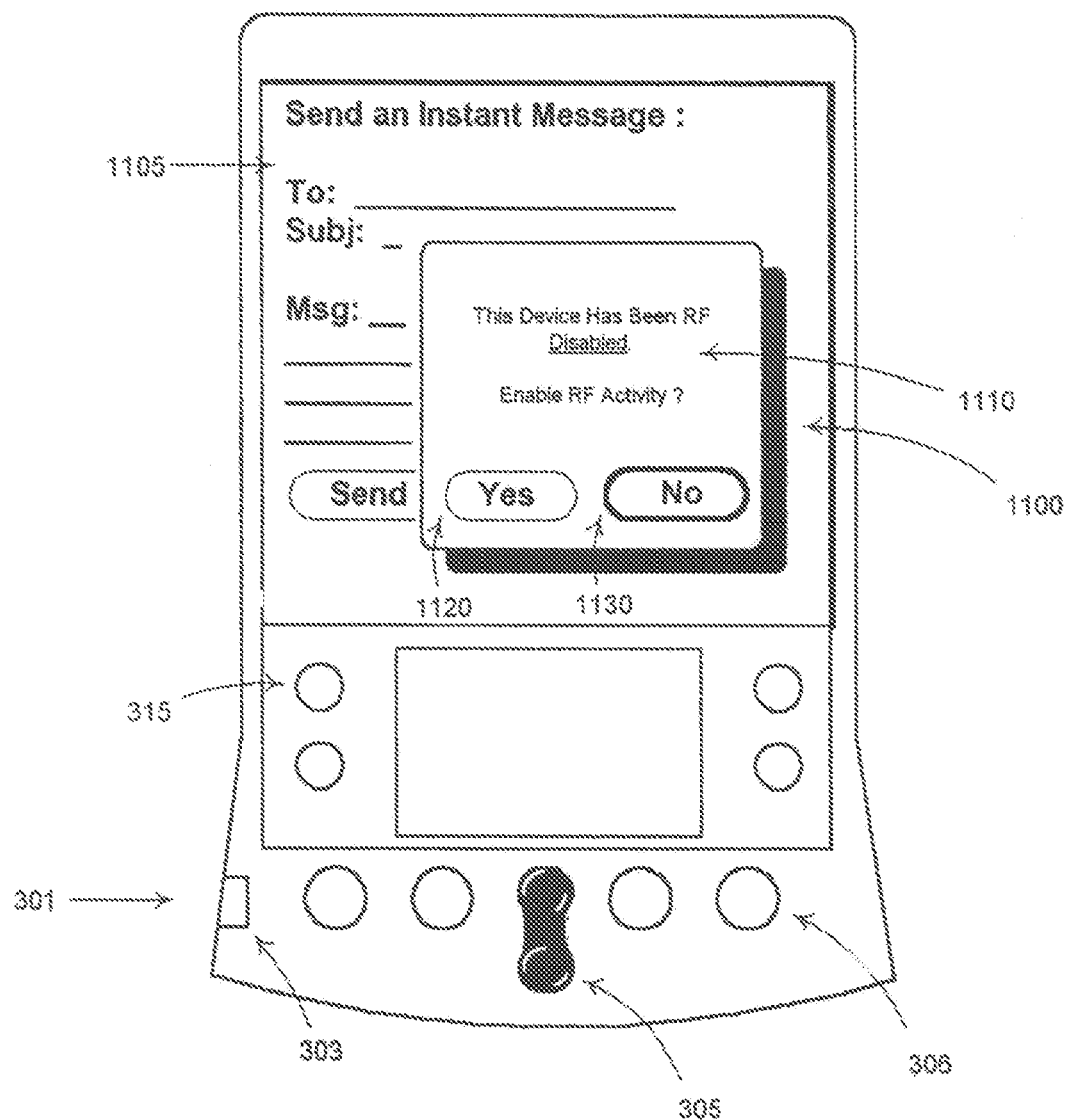
FIG. 11 is a drawing of an example RF device off warning message according to an embodiment of the disclosed embodiments.

FIG. 11 is one embodiment of an example warning message 1100 according to the present invention. With RF capabilities disabled, the user has invoked an application (instant messenger in this example) 1105 that requires RF capabilities. The RF device status is checked, and, since the RF device is disabled, the warning message 1100 is displayed. In one embodiment, the warning message includes text 1110 explaining that the RF device is disabled. User selectable buttons to continue (YES 1120) and do not activate (NO 1130) are also provided. Since it is important that the RF device not be unintentionally activated, the do not activate button (NO 1130, for example) is provided as a default (a shaded or bolded button, for example) or selection requires an affirmative button press or other response.

The texts and provided buttons of the warning message 1100 give the user the option to continue (step 1040). If the user selects NO, the RF control program is shut down without ever enabling the RF device (step 1050). If the user selects to continue, the RF device is automatically enabled (step 1060) and the control program continues execution (step 1070).

Figure 12:
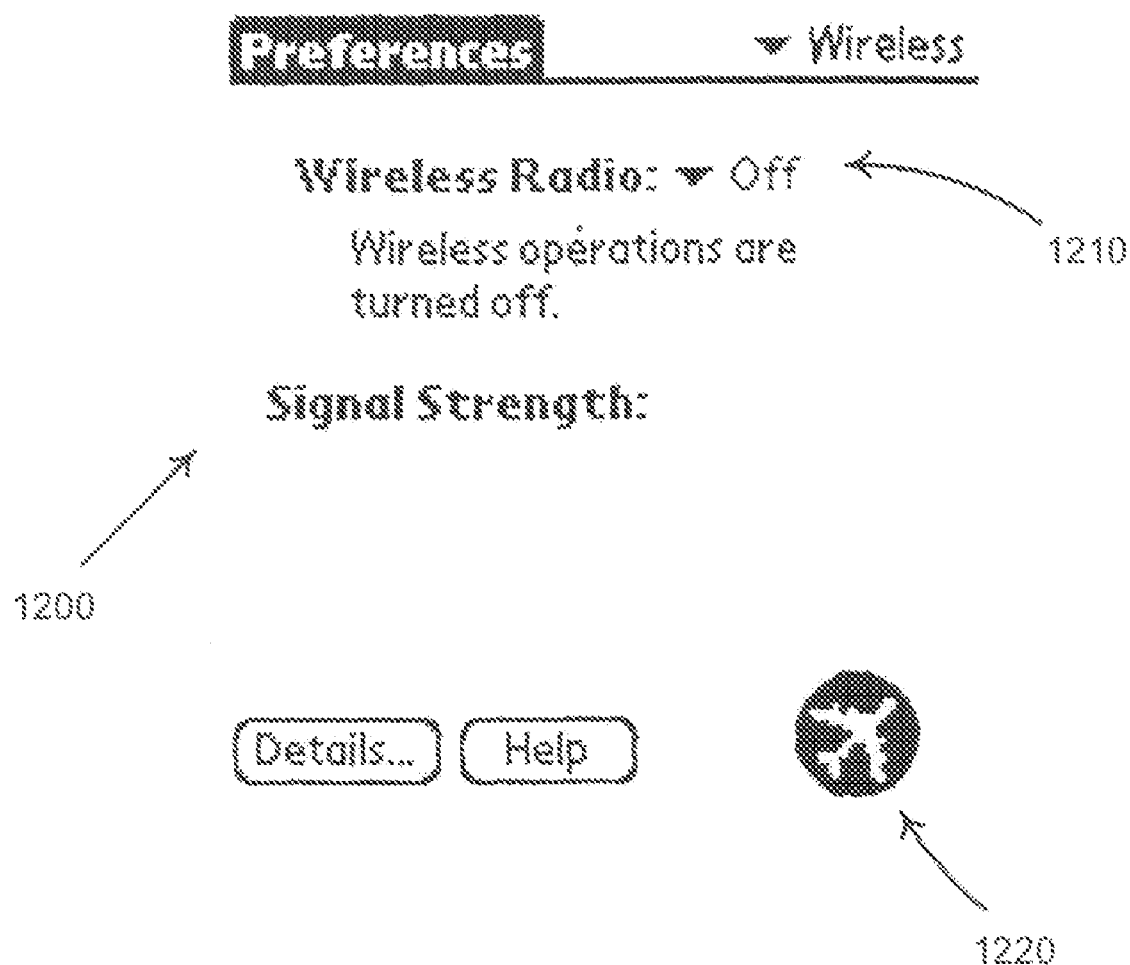
FIG. 12 is a screen shot of an embodiment of a wireless panel for a radio off preference.

FIG. 12 is a screen shot of an embodiment of a wireless panel 1200 for a preference selection 1210, currently selected (or default) to be Off. Preferably, the radio off setting is the default setting for the wireless radio. When implemented on a Palm™ device, current wireless radio settings are maintained across soft rests, but not hard resets. Following a hard rest the notification setting will default to OFF. When the wireless radio setting is set to Off an airplane icon 1220 will appear in the lower right hand corner of the screen to indicate it is safe for airplane travel.

Figure 13:
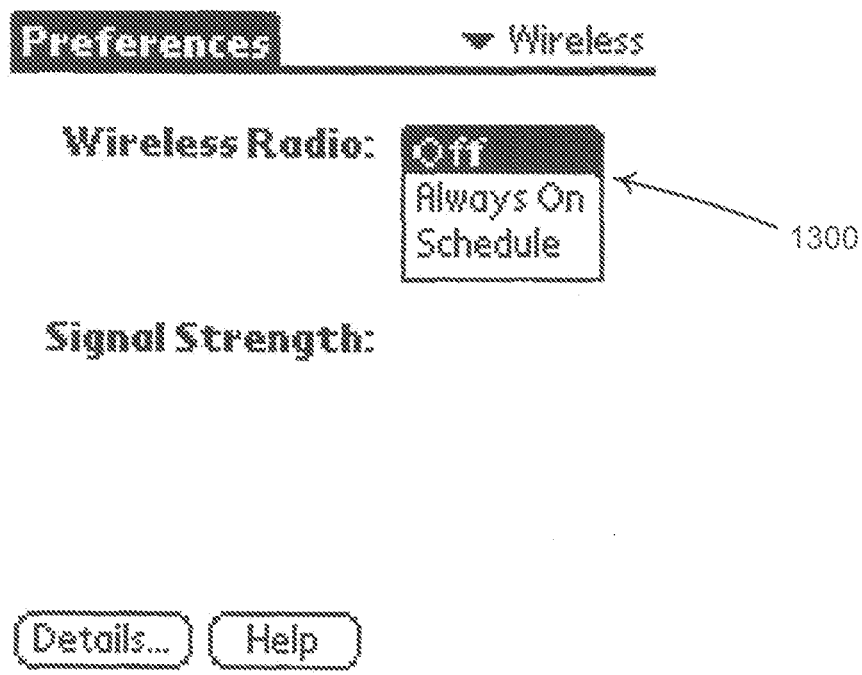
FIG. 13 is a screen shot of an embodiment of a wireless panel for selecting a radio preference.

FIG. 13 is a screen shot of an embodiment of a wireless panel for selecting a radio preference. A drop down menu 1300 indicating choices for Off, Always On, and Schedule is provided for selection of Wireless Radio preferences.

Figure 14:
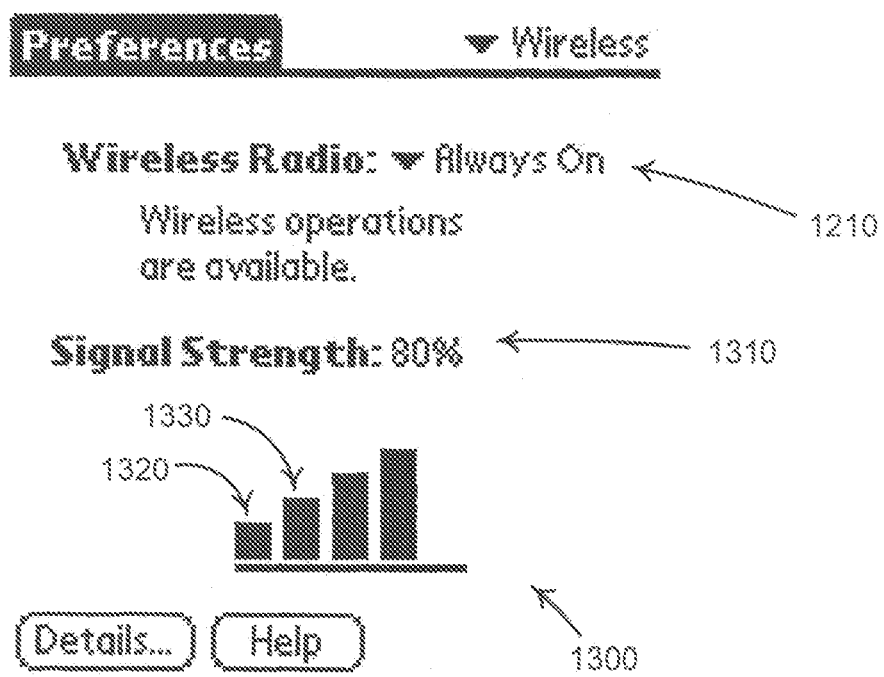
FIG. 14 is a screen shot of an embodiment of a wireless panel for a radio on preference.

FIG. 14 is a screen shot of an embodiment of a wireless panel for a radio on preference. Once the radio is On, a signal strength meter 1400 is displayed. The signal strength meter indicates a percentage of signal strength 1310 and displays bars (e-g., 1320, 1330) to graphically represent the signal strength.

Figure 15:
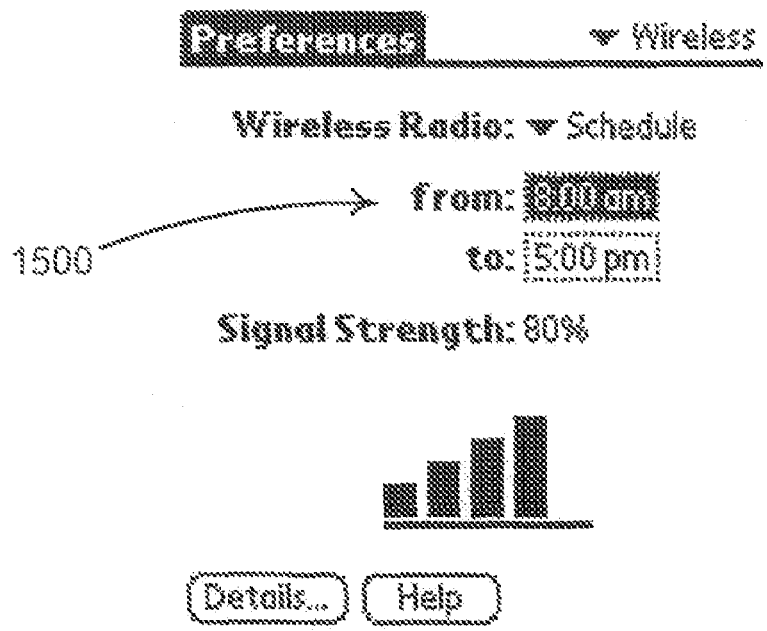
FIG. 15 is a screen shot of an embodiment of a wireless panel for a radio on schedule.

FIG. 15 is a screen shot of an embodiment of a wireless panel for a radio schedule 1500 including 'from:' and 'to:' radio on times. The schedule is invoked by selecting the schedule option from the wireless radio drop down menu 1300. The radio schedule 1500 prompts the 'from:' and 'to:' options to appear on the screen along with the signal strength percentage and bars. Tapping on 'from' will bring up a 'Set Radio Start Time' dialog 1600.

Figure 16:
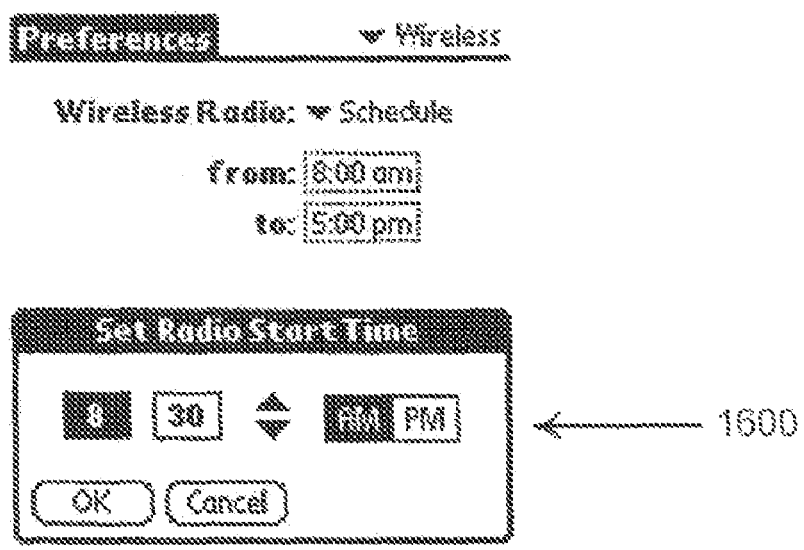
FIG. 16 is a screen shot of an embodiment of a wireless panel for selecting a radio on start time.

FIG. 16 is a screen shot of an embodiment of a wireless panel for selecting a radio on start time (via the 'Set Radio Start Time' dialog 1600). The dialog 1600 includes hours, minutes and AM/PM selection areas, and up/down arrows for adjusting a selected item. Tapping 'OK' sends the user back to the wireless radio schedule panel.

Figure 17:
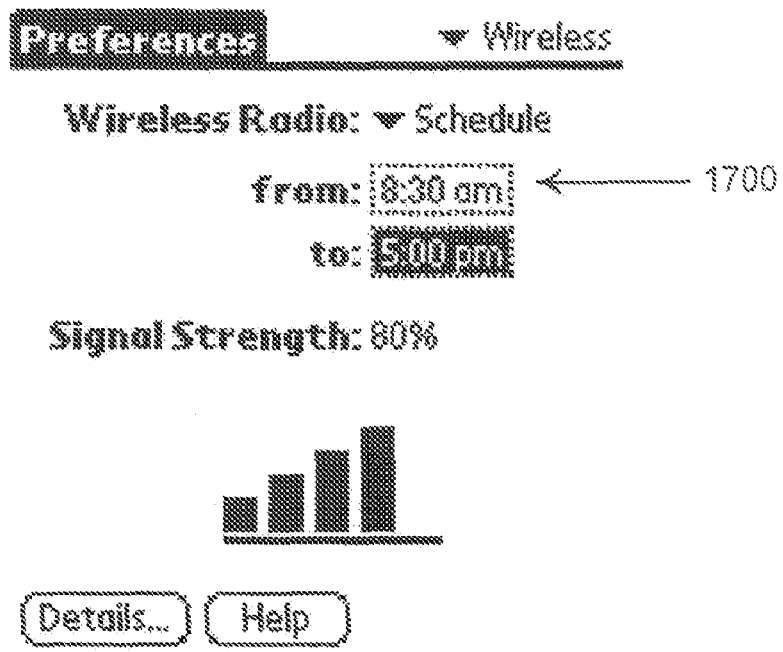
FIG. 17 is a screen shot of an embodiment of a wireless panel with a user selected radio on start time.
Figure 18:
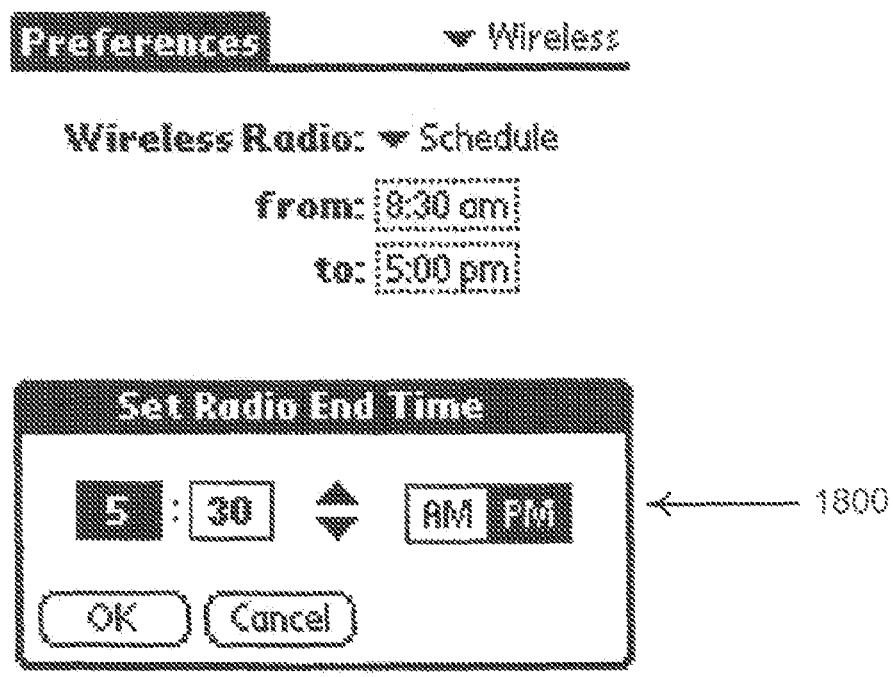
FIG. 18 is a screen shot of an embodiment of a wireless panel for selecting a radio end time.

FIG. 17 is a screen shot of an embodiment of the wireless radio schedule panel with a user selected radio on start time shown 8:30 AM, 1700). FIG. 18 is a screen shot of an embodiment of a wireless panel for selecting a radio end time. Similar to the radio start time, an end time dialog 1800 allows adjustment of the end time and appropriate buttons to confirm (OK) or disregard (Cancel) any times set by the dialog.

Figure 19:
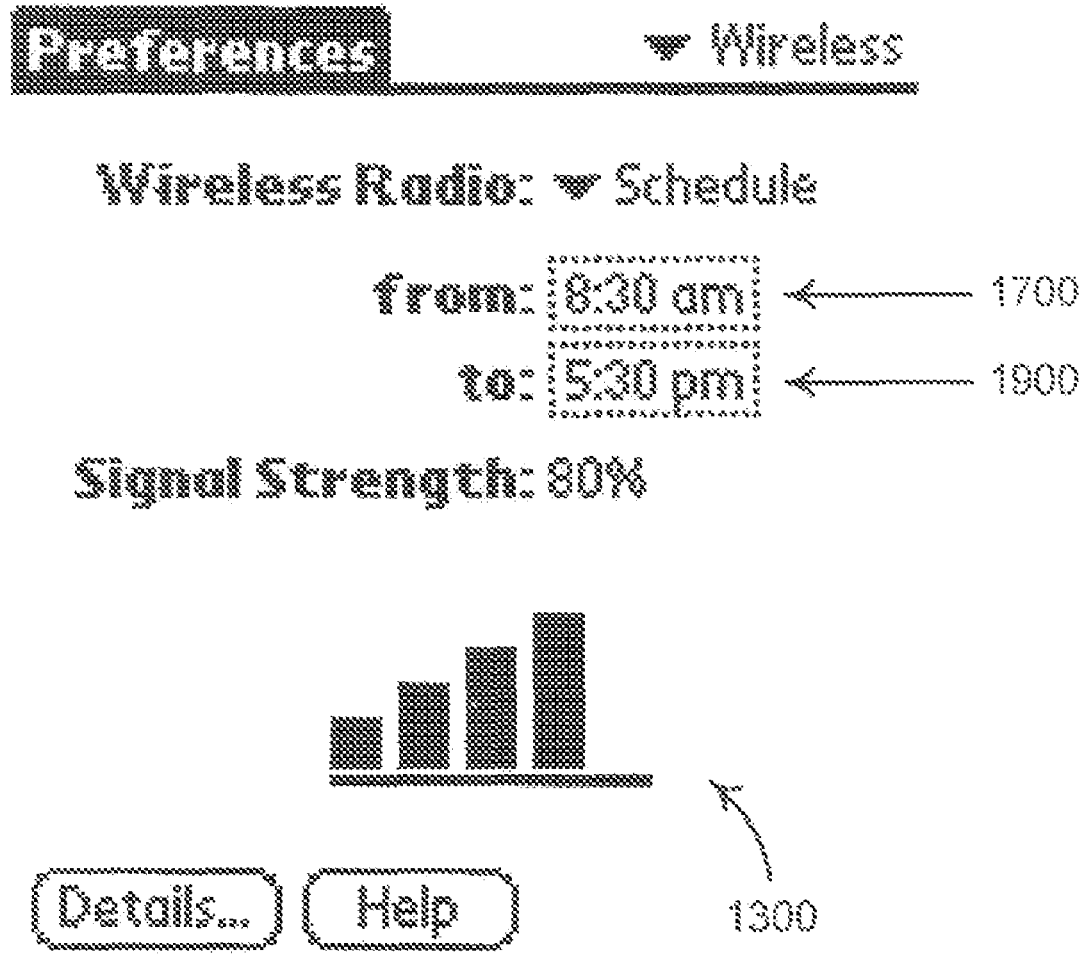
FIG. 19 is a screen shot of an embodiment of a wireless panel with user selected radio on start and end times.

FIG. 19 is a screen shot of an embodiment of a wireless panel with user selected radio on start (1700) and end (1900) times. Again, signal strength (1300) is shown. FIGS. 12-19 show specific embodiments of a possible implementation of the radio enablement/disablement and scheduling capabilities of the present invention. However, based on the present disclosure, many other arrangements may also be implemented without departing from the scope or spirit of the present invention.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, micro-drive, and magneto-optical disks, ROMs, RAMS, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, placing and receiving telephone calls or other communication operations, setting notifications on or off based on user inputs, including determining a scheduled time, setting alarms for waking processes for turning notification on/off and/or shutting down/activating RF devices(s), providing RF disabled or enabled confirmations, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. An electronic device, comprising:
   a radio unit configured to communicate with a network, the radio unit having an on state and an off state;
   a memory device configured to store a control program, the control program configured to control the radio unit; and
   a processing unit coupled to the radio unit and the memory device, the processing unit configured to execute the control program, the control program further configured to determine whether the radio unit is in the on state in response to receiving an event that utilizes the radio unit, configured to determine whether a notification is enabled in response to the radio unit being in the off state, and configured to activate a notification mechanism corresponding to a notification preference for the event that triggers the notification.

2. The electronic device of claim 1, wherein the memory device is further configured to store an application that utilizes the radio unit, and configured to store a notification program configured to notify a user that the radio unit is in the off state and the event utilizing the radio unit is received.

3. The electronic device of claim 2, wherein the notification program is further configured to give the user an option to either,
   switch the radio unit to the on state and allow the event to utilize the radio unit, or
   disallow the event from utilizing the radio unit and leaving the radio unit in the off state.

4. The electronic device of claim 1, farther comprises:
   a display screen;
   wherein the memory device is farther configured to store a notification program configured to generate a graphical user interface on the display screen having at least one software button programmed to enable and disable the radio unit.

5. The electronic device of claim 4, wherein the graphical user interface is a GUI having a first software button corresponding to the radio unit in the on state and a second software button corresponding to the radio unit in the off state, the particular state of the radio unit indicated by a visual character of the corresponding software button.

6. The electronic device of claim 1, farther comprising:
a physical button programmed to enable and disable the radio unit, wherein the physical button is a toggle switch that is activated by engaging the physical button for a predetermined length of time.

7. The electronic device of claim 6, wherein the physical button has at least one additional program invoked by pressing the physical button for a time period less than the predetermined length of time.

8. The electronic device of claim 6, wherein the predetermined length of time is approximately 1 second.

9. The electronic device of claim 1, wherein the control program is further configured to generate a user interface with a drop down menu having user selectable options for Radio On, Radio Off, and Schedule, and configured to implement an option selected by the user.

10. The electronic device of claim 1, wherein the memory device is further configured to store a scheduling application that provides user modifiable start and stop times that indicate when the radio unit is enabled and disabled.

11. A method for notifying a user of an event utilizing a radio unit, comprising:
receiving the event in an electronic device;
determining that the event utilizes a radio unit of the electronic device;
determining the status of the radio unit; and
responsive to the status of the radio unit being off:
determining whether a notification mechanism is enabled, and
activating the notification mechanism corresponding to a pre-determined user preference for the event in response to the notification mechanism being enabled.

12. The method of claim 11, further comprising setting a first pre-determined user preference for the event corresponding to a first communication mechanism and setting a second pre-determined user preference for the event corresponding to a second communication mechanism.

13. The method of claim 12, wherein the first communication mechanism is an email and the second communication mechanism is a voice mail service.

14. The method of claim 12, wherein the first communication mechanism is a phone call and the second communication mechanism is an email.

15. A computer program product stored on a computer readable medium for operating an electronic device, the computer program product controlling a processor coupled to the medium to perform the operations of:
receiving an event in the electronic device;
determining that the event utilizes a radio unit of the electronic device;
determining the status of the radio unit; and
responsive to the status of the radio unit being off:
determining whether a notification mechanism is enabled, and
activating the notification mechanism corresponding to a pre-determined user preference for the event in response to the notification mechanism being enabled.

16. The computer program product of claim 15, wherein the operations further comprises setting a first pre-determined user preference for the event corresponding to a first communication mechanism and setting a second pre-determined user preference for the event corresponding to a second communication mechanism.

17. The computer program product of claim 16, wherein the first communication mechanism is an email and the second communication mechanism is a voice mail service.

18. The computer program product of claim 16, wherein the first communication mechanism is a phone call and the second communication mechanism is an email.

* * * * *

UNITED STATES PATENT AND TRADEMARK OFFICE
CERTIFICATE OF CORRECTION

PATENT NO. : 7,474,892 B2 Page 1 of 1
APPLICATION NO. : 11/769626
DATED : January 6, 2009
INVENTOR(S) : Craig S. Skinner et al.

It is certified that error appears in the above-identified patent and that said Letters Patent is hereby corrected as shown below:

Column 12,
Claim 4, Line 57, please replace "farther" with --further--
Claim 4, Line 59, please replace "farther" with --further--

Signed and Sealed this

Thirty-first Day of March, 2009

JOHN DOLL
*Acting Director of the United States Patent and Trademark Office*